United States Patent [19]

Evans

[11] 4,109,748
[45] Aug. 29, 1978

[54] STEERING APPARATUS
[75] Inventor: Dafydd W. Evans, Euclid, Ohio
[73] Assignee: Towmotor Corporation, Mentor, Ohio
[21] Appl. No.: 773,104
[22] Filed: Feb. 28, 1977
[51] Int. Cl.² .............................................. B62D 5/00
[52] U.S. Cl. ...................................... 180/141; 180/163
[58] Field of Search ............... 180/132, 134, 135, 136, 180/137, 138, 139, 141, 142, 154, 163, 97, 143

[56] References Cited
U.S. PATENT DOCUMENTS

| Re. 26,802 | 2/1970 | Symons | 180/136 |
|---|---|---|---|
| 2,139,569 | 12/1938 | Alvarado | 180/103 R |
| 2,902,104 | 9/1959 | Schilling | 180/141 |
| 3,171,298 | 3/1965 | Biabaud | 180/143 |
| 3,338,328 | 8/1967 | Cataldo | 180/79.1 |
| 3,566,749 | 3/1971 | Allen | 180/139 X |
| 3,866,706 | 2/1975 | Lincke | 180/142 |

Primary Examiner—Joseph F. Peters, Jr.
Assistant Examiner—R. Schrecengost
Attorney, Agent, or Firm—John L. James

[57] ABSTRACT

Steering apparatus is provided for a vehicle which has a steering axle assembly which is movable between a first position at which the turning radius in a first direction of the vehicle is at a preselected minimum value, a second position at which the turning radius of the vehicle is infinite, and a third position at which the turning radius in a second direction of the vehicle is at a preselected minimum value. The second position is intermediate the first and third positions. The steering apparatus controls the turning radius of the vehicle in response to a predetermined operational rate by automatically restricting the movement of the steering axle assembly towards the first and third positions while leaving the steering axle assembly free for movement towards the second position.

12 Claims, 5 Drawing Figures

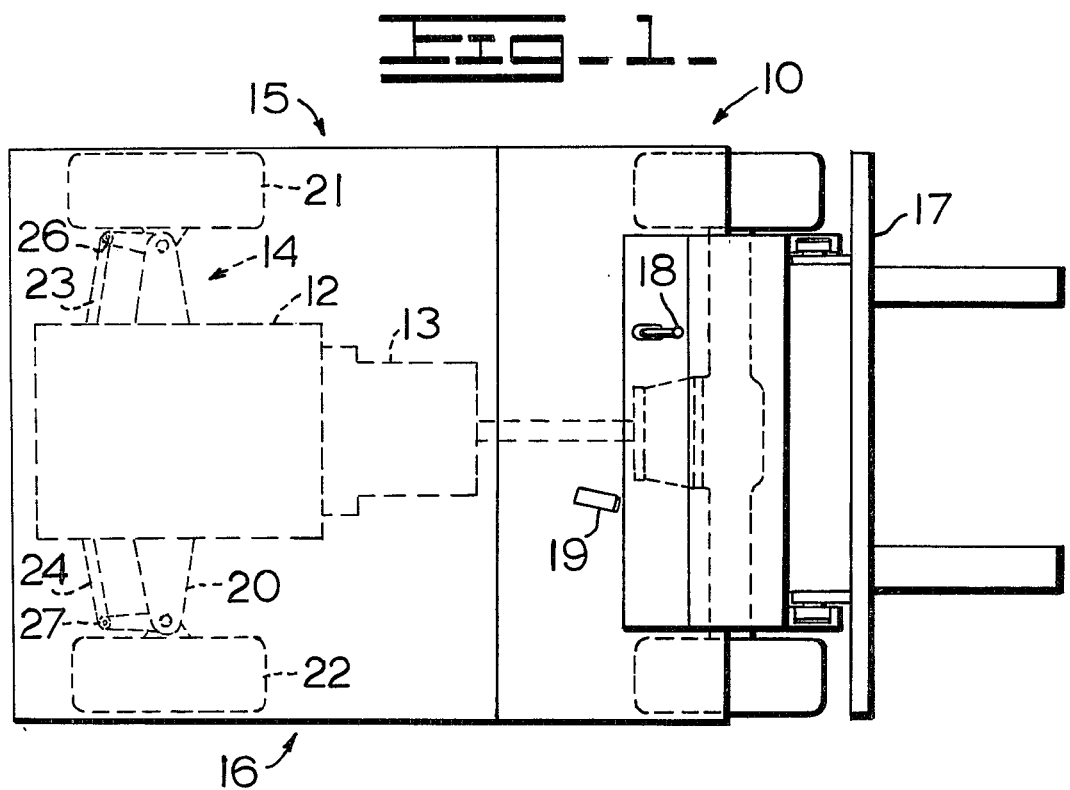
Fig-1-
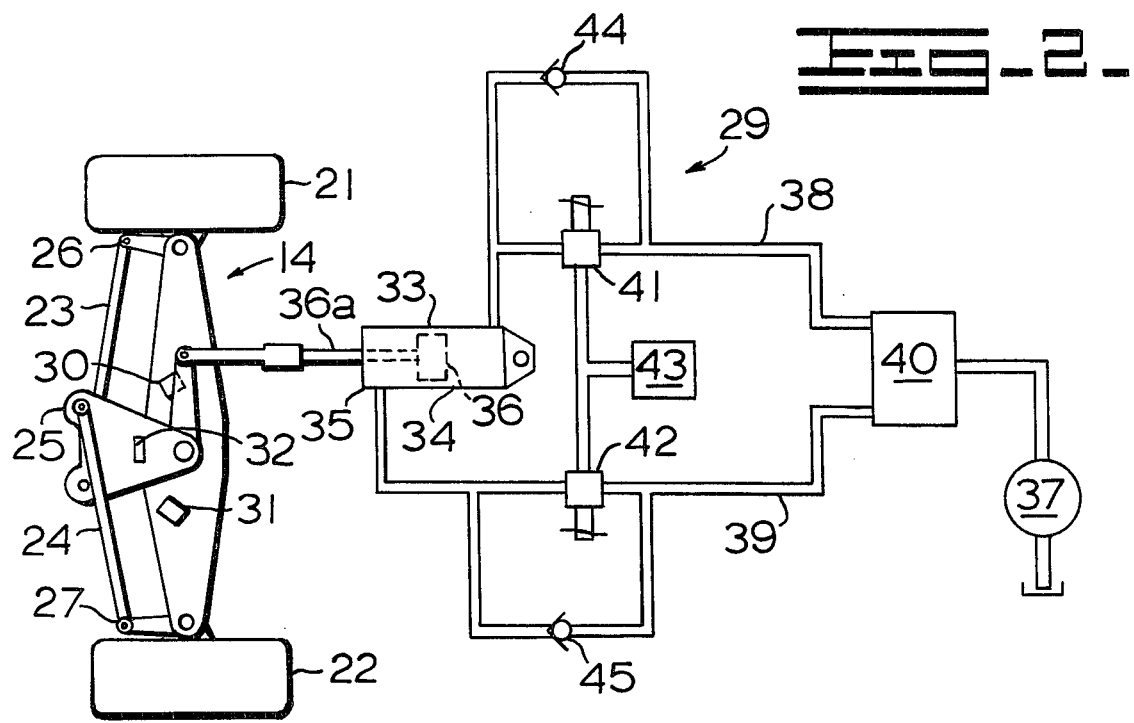
Fig-2-

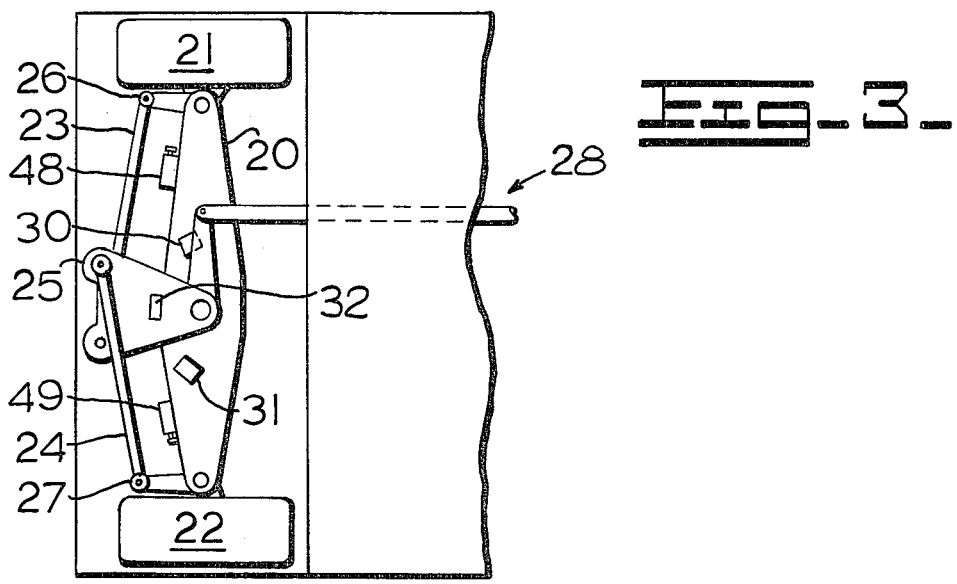
Fig_3_
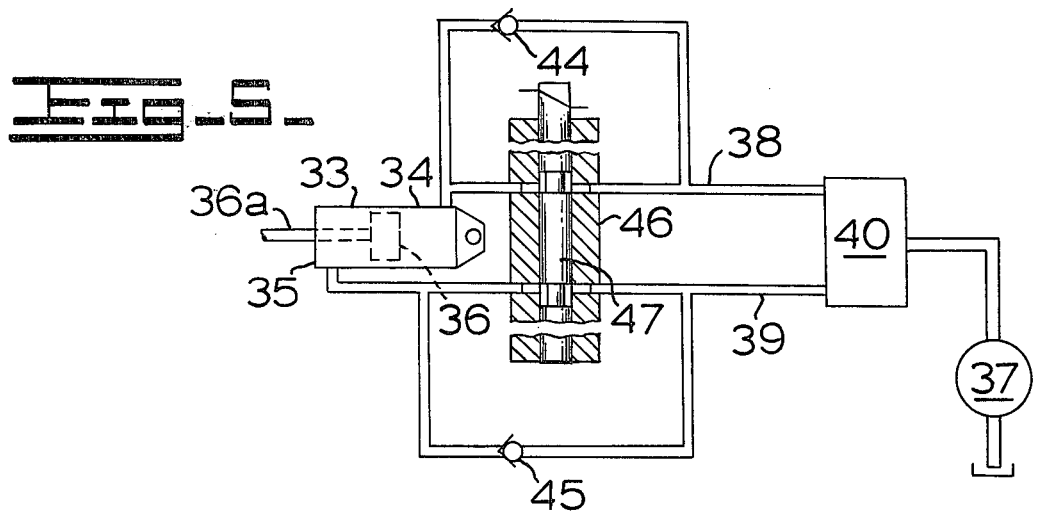
Fig_5_
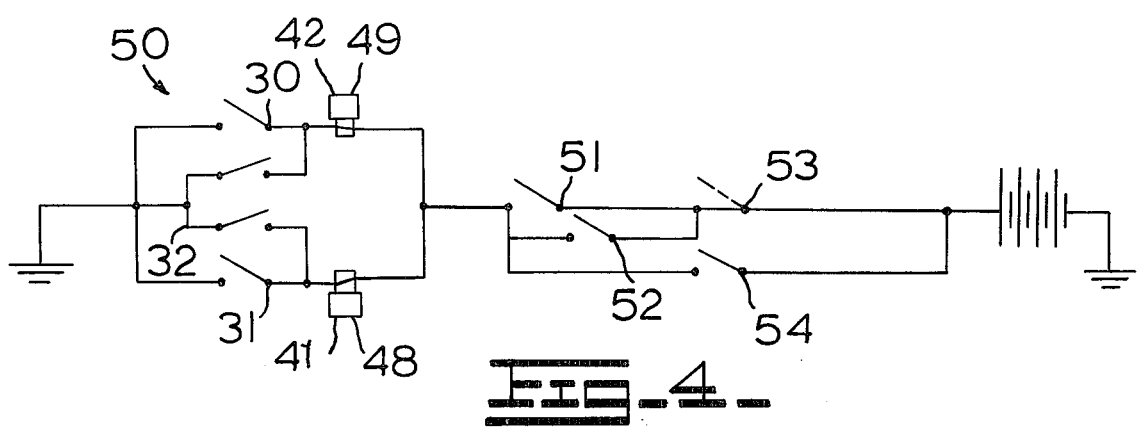
Fig_4_

STEERING APPARATUS

BACKGROUND OF THE INVENTION

Current vehicles, such as fork lift trucks, offer a combination of performance characteristics such as speed and maneuverability. These performance characteristics may be combined by an untrained, careless or reckless operator to cause excessive side moment of the vehicle. Excessive side moments can cause side overturn of the lift truck and other current vehicles. High travel speed is desirable for long, straight runs and a small turning radius is desirable for maneuvering in confined areas, such as narrow warehouse isles which are used to optimize warehouse space. Improper operation of a lift truck or other vehicle under extreme conditions such as a sharp turn at a high speed, may cause a side overturn. This is particularly true where the vehicle is equipped with highly responsive power steering. It is wasteful to limit vehicle speed owing to the fact that lower speed results in lower productivity and increased cost of operation. It is also undesirable to limit vehicle maneuverability.

The present invention is directed to overcoming one or more of the problems as set forth above.

According to the present invention, steering override apparatus is provided for a vehicle which has a steering axle assembly movable between a first position at which the turning radius in a first direction of the vehicle is at a preselected minimum value, a second position at which the turning radius of said vehicle is infinite, and a third position at which the turning radius in a second direction of the vehicle is at a preselected minimum value. The apparatus controls the turning radius of the vehicle in response to a predetermined operational rate by automatically limiting the movement of the steering axle assembly.

BRIEF DESCRIPTION OF THE DRAWINGS

FIG. 1 is a partial plan view of a lift truck;

FIG. 2 is a partial plan view similar to FIG. 1 but illustrating power steering apparatus;

FIG. 3 is a partial plan view similar to FIG. 1 but illustrating manual steering apparatus;

FIG. 4 is a schematic illustration of the present invention; and

FIG. 5 is a partial plan view similar to FIG. 2.

DETAILED DESCRIPTION OF THE INVENTION

Referring to FIG. 1, a vehicle, such as a fork lift truck 10, for example, has a frame 11 to which an engine 12, transmission 13 and steering axle assembly 14 are connected. The steering axle assembly 14 is movable between a first position at which the turning radius of the lift truck 10 in a first direction is a preselected minimum value, a second position at which the turning radius of the lift truck 10 is infinite, and a third position at which the turning radius of the lift truck 10 in the second direction is a preselected minimum value. The second position is intermediate the first and third positions. The first position could enable the lift truck 10 to make a left turn and the second intermediate position would enable the lift truck 10 to travel straight ahead while the third position would enable the lift truck to make a right turn. The lift truck 10 also has left and right sides 15, 16, a lift mast 17, a lift mast control 18, and an inching control 19 which is a low speed operation control preferably associated with the transmission 13. The lift truck can be equipped with various devices (not shown) which respond to various conditions such as vehicle, transmission and engine speeds or the like. These various conditions from the operational rate of the lift truck 10. For example, the lift truck 10 could have one rate for long, straight runs formed of engine and transmission speeds and a different operational rate for maneuvering in confined areas formed of the lift truck 10 speed and angle of the steering axle assembly 14.

Referring to FIGS. 2 and 3, the steering axle assembly 14 includes an axle 20 and preferably left and right wheels 21, 22 rotatably connected on the axle 20. The terms left and right as used herein indicate that the component is respectively located on the left side 15 or right side 16 of the lift truck 10 or that the component is actuated during a left or right turn or that the component is actuated to effect a left or right turn. The axle assembly 14 also includes left and right steering rods 23, 24 and a linking mechanism 25 which is mounted on the axle 20 and pivotally connected to the steering rods 23, 24. Left and right steering knuckles 26, 27 connect the left and right steering rods 23, 24, respectively, with the left and right wheels 21, 22. The linking mechanism 25 can link the steering rods 23, 24 with traditional manual steering apparatus 28 (FIG. 3) or with power steering apparatus 29 (FIG. 2). Left and right turn switches 30, 31 are preferably mounted on the axle 20 at predetermined locations on the respective left and right sides 21, 22 of the lift truck 10. The turn switches 30, 31 are positioned for selective activating contact with one of the linking mechanism 25 or steering rods 23, 24. The turn switches 30, 31 can be micro-switches or other suitable types of switches. A tilt switch 32 can be mounted on the axle 20 or on the linking mechanism 25. The tilt switch 32 may be a mercury switch or the like and is actuated by tilting the lift truck 10 to a preselected altitude. Such tilting is normally realized during operation of the lift truck 10 on a nonlevel pathway such as an incline or the like.

Referring to FIG. 2, the power steering apparatus 29 includes a preferably double acting steering cylinder 33 connected to the linking mechanism 25. The cylinder 33 is preferably fluid actuated and is divided into left and right chamber portions 34, 35 by a slidable piston 36 which is connected to the linking mechanism 25 by a piston actuator arm 36a. The left and right chambers 34, 35 are in fluid communication with a source of fluid pressure, such as a pump 37 or the like, by way of left and right conduits 38, 39 and a power steering valve 40. Left and right solenoid valves 41, 42 or the like, control fluid flow to the respective left and right chambers 34, 35. The valves 41, 42 are each preferably operable between a first position at which fluid flows freely to the cylinder 33 and fluid flow to reservoir 43 is blocked and a second position at which fluid flow to the cylinder 33 is blocked. When either of the valves 41, 42 is in the second position, fluid can flow to a fluid reservoir 43 and fluid flow to cylinder 33 is blocked. Left and right one-way valves, such as left and right check valves 44, 45 control fluid flow from the respective left and right chambers 34, 35 when the appropriate solenoid valve 41, 42 is in the second position. The left and right check valves 44, 45 are respectively connected fluidly in parallel with the left and right solenoid valves 41, 42. The left and right solenoid valves 41, 42 are respectively connected electrically in series with the left and right turn switches 30, 31 and connected electrically in parallel one to the other (FIG. 4). A unitary structure 46 which has a single self-centering stem 47 can be used instead of separate left and right solenoid valves 41, 42 (FIG. 5). The stem 47 of the unitary structure 46 is movable between the center position shown in FIG. 5 and a first position at which fluid flows to the right chamber 35 of the cylinder 33 and fluid flow to the left chamber 34 is blocked and a second position at which fluid flows to the left chamber 34 and fluid flow to the right chamber 35 is blocked.

Referring to FIG. 3, the lift truck 10 equipped with the manual steering apparatus 28 incorporates adjustable left and right motion limiters, such as solenoids 48, 49 or the like, preferably connected to the axle 20. The motion limiters can be a fluid operated device such as a fluid motor or the like (not shown). The left and right solenoid limiters 48, 49 are preferably engageable with the respective left and right steering knuckles 26, 27. The left and right solenoid limiters 48, 49 are respectively connected electrically in series with the left and right turn switches 30, 31 and connected electrically in parallel one to the other.

Referring to FIG. 4, first and second switches 51, 52 or similar devices can be connected in series with the turn switches 30, 31 and in parallel one with the other. The first and second switches 51, 52 are actuated by various engine and transmission devices (not shown). A manually actuated override switch 53 is connected in series with the first and second switches 51, 52. Other switches (not shown) actuated by the lift control 18, the inching control 19, and other controls and devices can also be connected in series with the left and right turn switches 30, 31. The tilt switch 32 (FIG. 2) can be connected electrically in series with the left and right solenoid valves 38, 39 or the left and right solenoid motion limiters 48, 49. The tilt switch 32 is preferably connected in series with a third switch 54 actuated in response to the speed of the lift truck 10. The tilt switch 32 is preferably connected in parallel with the left and right turn switches 30 and 31.

Operation of the present invention is schematically illustrated by the circuit 50 of FIG. 4. In the circuit 50, the left and right solenoid motion limiters 48, 49 are respectively interchangeable with the left and right solenoid valves 41, 42. One of the solenoids of each pair of solenoids 41, 42 and 48, 49 is actuated when a proper series of switches is actuated. A proper series of switches can consist of the left turn switch 30 and first switch 51 or second switch 52, for instance. A proper series of switches can also consist of the tilt switch 32 and third switch 54 where the lift truck 10 operates on an inclined or nonlevel pathway or the third switch 54 and either turn switch 30, 31 where the lift truck 10 operates on a level pathway. The tilt switch 32 and turn switches 30, 31 can be used simultaneously in parallel series of switches. The solenoids 41, 42 and 48, 49 can be controlled by various combinations of switches actuated in response to various conditions, such as engine speed or the like. The basic switches for operation of the lift truck on a level pathway are the left and right turn switches 30, 31 which are respectively actuated when the lift truck 10 attempts left and right turns of a predetermined radius. When actuated, the left and right solenoid motion limiters 48, 49 physically restrain the steering assembly 14 preferably by physically restraining the respective left and right steering knuckles 26, 27. This prevents the lift truck 10 from decreasing its turning radius or makes it more difficult to do so. Similarly, the left and right solenoid valves 41, 42 physically restrict or restrain fluid flow to the respective left and right chambers 34, 35 of the steering cylinder 33 and prevent the lift truck 10 from easily decreasing its turning radius. The operator can actuate override switch 53 to disable the solenoids 41, 42 and 48, 49 when lifting or inching on a level pathway or whenever it is desirable to do so.

Other aspects, objects, and advantages of the present invention will become apparent from a study of the specification, drawing, and appended claims.

The embodiments of the invention in which an exclusive property or privilege is claimed are defined as follows:

1. Steering override apparatus for a vehicle having a steering axle assembly movable between a first position at which the turning radius in a first direction of said vehicle is at a preselected minimum value, a second position at which the turning radius of said vehicle is infinite, and a third position at which the turning radius in a second direction of said vehicle is at a preselected minimum value, said second position being intermediate said first and third positions comprising:

means for controlling the turning radius of said vehicle in response to a predetermined operational rate by automatically restricting the movement of said steering axle assembly towards said first and third positions while leaving said steering axle assembly free for movement towards said second position, said control means including a double acting cylinder having an actuator arm and left and right chamber portions and being pivotally connected to said steering axle assembly.

2. An apparatus, as set forth in claim 1, wherein the control means includes a source of pressurized fluid, a left solenoid valve in fluid communication with said left chamber portion of said power steering cylinder and said source of pressurized fluid, and a right solenoid valve in fluid communication with said right chamber portion of said steering cylinder and said source of pressurized fluid.

3. An apparatus, as set forth in claim 2, including left and right check valves connected in parallel with respective left and right solenoid valves.

4. An apparatus, as set forth in claim 3, wherein said left and right solenoid valves form a unitary structure.

5. An apparatus, as set forth in claim 4, wherein said unitary structure has a single self-centering stem.

6. An apparatus, as set forth in claim 3, including left and right turn switches connected to said steering axle assembly and connected in series with respective left and right solenoid valves, said solenoid valves being connected electrically one to the other in parallel.

7. An apparatus, as set forth in claim 6, including a first switch associated with means responsive to the operational speed of said vehicle and being connected to said left and right solenoid valves and in series with both left and right turn switches.

8. An apparatus, as set forth in claim 6, wherein the vehicle has an engine and a second switch associated with means responsive to the operational speed of said engine, said second switch being connected to said left and right solenoid valves and in series with both left and right turn switches.

9. An apparatus, as set forth in claim 6, wherein the vehicle has a transmission and a third switch associated with means responsive to the operational speed of said transmission, said third switch being connected to said left and right solenoid valves and in series with both left and right turn switches.

10. An apparatus, as set forth in claim 6, including an override switch connected to said left and right solenoid valves and being in series with both left and right turn switches.

11. Steering override apparatus for a vehicle having a steering axle assembly movable between a first position at which the turning radius in a first direction of said vehicle is at a preselected minimum value, a second position at which the turning radius of said vehicle is infinite, and a third position at which the turning radius in a second direction of said vehicle is at a preselected minimum value, said second position being intermediate said first and third positions comprising:

means for controlling the turning radius of said vehicle in response to a predetermined operational rate by automatically restricting the movement of said steering axle assembly towards said first and third positions while leaving said steering axle assembly free for movement towards said second position, said control means including left and right motion limiters positioned for selective abutting engagement with said steering axle assembly.

12. An apparatus, as set forth in claim 11, including left and right turn switches connected in series with respective left and right motion limiters, said motion limiters being connected one to the other in parallel.

* * * * *